US008480055B2

(12) United States Patent
Strauss et al.

(10) Patent No.: US 8,480,055 B2
(45) Date of Patent: Jul. 9, 2013

(54) SOLENOID ARRANGEMENT AND VALVE ARRANGEMENT

(75) Inventors: Klemens Strauss, Frammersbach (DE); Juergen Gruen, Lohr am Main (DE); Horst Bartel, Lohr am Main (DE); Roland Schempp, Vaihingen (DE)

(73) Assignee: Robert Bosch GmbH, Stuttgart, DE (US)

( * ) Notice: Subject to any disclaimer, the term of this patent is extended or adjusted under 35 U.S.C. 154(b) by 42 days.

(21) Appl. No.: 13/003,478

(22) PCT Filed: Jul. 3, 2009

(86) PCT No.: PCT/EP2009/004816

§ 371 (c)(1), (2), (4) Date: Feb. 3, 2011

(87) PCT Pub. No.: WO2010/003592

PCT Pub. Date: Jan. 14, 2010

(65) Prior Publication Data

US 2011/0168932 A1 Jul. 14, 2011

(30) Foreign Application Priority Data

Jul. 11, 2008 (DE) ......................... 10 2008 032 727

(51) Int. Cl.
*F16K 31/02* (2006.01)

(52) U.S. Cl.
USPC ....... 251/129.15; 335/279; 335/281; 335/297

(58) Field of Classification Search
USPC ................ 251/129.15, 129.02; 335/262, 297, 335/279, 281
See application file for complete search history.

(56) References Cited

U.S. PATENT DOCUMENTS

| | | | | |
|---|---|---|---|---|
| 6,268,784 | B1 * | 7/2001 | Feigel et al. | 335/261 |
| 6,315,268 | B1 | 11/2001 | Cornea et al. | |
| 6,344,783 | B1 | 2/2002 | Neuhaus et al. | |
| 6,453,930 | B1 * | 9/2002 | Linkner et al. | 137/15.18 |
| 6,827,331 | B1 | 12/2004 | Roos | |
| 6,877,717 | B2 * | 4/2005 | Collins et al. | 251/129.15 |
| 2004/0051068 | A1 * | 3/2004 | Bartolacelli et al. | 251/129.15 |
| 2006/0043326 | A1 | 3/2006 | Linkner, Jr. et al. | |
| 2006/0243938 | A1 * | 11/2006 | Ishibashi et al. | 251/129.15 |
| 2007/0236089 | A1 | 10/2007 | Okubo | |
| 2007/0252100 | A1 * | 11/2007 | Kitagawa et al. | 251/129.21 |

FOREIGN PATENT DOCUMENTS

| | | | |
|---|---|---|---|
| DE | 4438158 | A1 | 5/1995 |
| DE | 19717445 | A1 | 10/1998 |
| DE | 19934486 | A1 | 1/2001 |
| DE | 19953788 | A1 | 5/2001 |
| DE | 102006047923 | A1 | 4/2008 |
| EP | 0204293 | A1 | 12/1986 |

* cited by examiner

*Primary Examiner* — John K Fristoe, Jr.
*Assistant Examiner* — Ian Paquette
(74) *Attorney, Agent, or Firm* — Maginot, Moore & Beck

(57) ABSTRACT

The invention relates to a solenoid wherein a magnetic discontinuity is formed in the pole tube reducing the effective material thickness, such as by reducing the thickness, particularly the wall thickness of the magnetically active material, the front face of the armature facing the pole core and a bottom face in the interior of the pole tube at the pole core each have a contour allowing mutual axial overlapping. This enables advantageous influencing of the force-stroke characteristic curve of the solenoid with low production effort.

15 Claims, 3 Drawing Sheets

SOLENOID ARRANGEMENT AND VALVE ARRANGEMENT

CROSS-REFERENCE TO RELATED APPLICATION

This application is a 35 USC 371 application of PCT/EP2009/004816 filed on Jul. 3, 2009.

BACKGROUND OF THE INVENTION

1. Field of the Invention

The invention relates to a solenoid arrangement. The invention also relates to a valve arrangement.

2 Description of the Prior Art

The solenoid arrangement of this generic type is often used in fluidics as a drive for actuating hydraulic or pneumatic valves.

Actuation magnets in fluidics are usually of modular construction and have a pole tube which is fluid-tight except for a through opening for the tappet and in which the armature is movable. A coil body is slipped over the pole tube. The coil body is secured with a nut. A separating ring of nonmagnetic material is typically welded in place between a pole core segment and a tube segment of the pole tube. As a result, the magnetic field lines in the pole tube pass from the pole core segment to the armature. Only in that way can a working air gap filled with field lines develop.

Precisely with switching valves, solenoids of the simplest possible construction are employed. For example, German Patent Application 10 2008 030 748 of the present Applicant describes a pole tube which, in order to generate the requisite discontinuity between the pole core and the tube segment, has a reduced material thickness in the vicinity of the transition segment. In that case, a secondary magnetic flux through the transition segment is tolerated for the sake of simpler production of the pole tube. These pole tubes are also called thin—turned pole tubes, since the reducing in the material thickness is typically done by turning on a lathe. However—in comparison to the usable magnetic flux sent through the working air gap—that requires a considerable secondary flux. If a thin-turned pole tube is used instead of a conventional pole tube, the presumptive force loss for a solenoid is about 10%, on the condition that the coil capacity is identical. Moreover, solenoids with thin-turned pole tubes often have a force-stroke characteristic curve that is very unfavorable for the valve actuation, as the characteristic curve 42 for a conventional solenoid in FIG. 3 shows. The actuation force rises significantly just before the armature makes contact with the pole core. A fluidic valve, however, requires a sufficient actuation force over a greater stroke range.

OBJECT AND SUMMARY OF THE INVENTION

It is the object of the present invention to disclose an improved solenoid arrangement, which in particular has a characteristic curve suited to the valve actuation.

This object is attained by a solenoid arrangement according to the invention.

In a solenoid in which a magnetic discontinuity in the pole tube is formed by means of reducing the effective material thickness—such as a reduction in the thickness and in particular the wall thickness of the magnetically effective material—the invention is based in general on the concept of providing both the face end, toward the pole core segment, of the armature and a bottom, provided in the interior of the pole tube on the pole core segment, with a respective contour that allows a mutual axial overlap. This makes advantageous variation of the force-stroke characteristic curve of the solenoid possible, at low production cost.

An embodiment in which the transition segment between the pole core segment and the tube segment of the pole tube has a reduced wall thickness, is especially preferred. In addition, by means of a protruding bolster, a step is formed on the armature. The bottom face on the pole core segment is likewise stepped by means of a cylindrical countersunk feature. The bolster of the armature can be received in the countersunk feature, such that at least a segment of the bolster dips into the countersunk feature when the armature contacts the bottom face.

In this way, the force-stroke characteristic curve of the solenoid arrangement can be designed such that a sufficient actuation force is available over a greater range of the characteristic curve. Because of the mode of construction according to the invention, the magnetic field lines are concentrated more strongly on the region between the armature and the bottom face of the pole core segment. As a result, over the course of the armature as it moves from its terminal position remote from the pole core to where the bolster dips into the countersunk feature, a strong actuation force is available. Just before the bolster dips into the countersunk feature, the actuation force rises markedly. After this plunge, the actuation force drops. Over the remaining course of the armature stroke until it contacts the bottom face, a moderate actuation force is available. Because of the reduced actuation force in the final stroke segment, the mechanical load on the pole tube, and on a nonstick disk that may be present between the armature and the pole core segment, is also reduced. Furthermore, better switching times are achieved.

By means of the solenoid arrangement of the invention, valves that usually require strong actuation forces right at the outset of an opening operation of the valve slide can be triggered or connected through securely. Because of the strong actuation force that is already present in a segment of the stroke remote from the pole core, it is possible to use a relatively weakly dimensioned coil. The required electrical current for the actuation is reduced, compared to conventional solenoids. Moreover, a solenoid arrangement can now be furnished that even when using thin-turned pole tubes has a precisely defined characteristic curve that is largely independent of production-dictated variations. In the present application, for the sake of simplicity, the term “thin-turned pole tube” is used. However, this term is meant to apply generally to solenoid arrangements having a pole tube that has a reduced wall thickness in the transition segment between the pole core and the tube segment. The reduced wall thickness can be created not only by turning but also by other processes. Examples that can be named are roller-burnishing, round-kneading, or stretching of a bar-shaped semifinished product, or molding of a ring of nonmagnetic material, as described in the aforementioned German Patent Application 10 2008 030 748 of the present Applicant. All these methods for reducing the wall thickness in the transition segment are meant to be included in the term “thin-turned pole tube”.

The object is also attained by a valve arrangement which is equipped with a solenoid arrangement of this kind. By adaptation of the contours, especially the length of the bolster and optionally the length of a collar on the pole core segment, the force-stroke characteristic curve of the solenoid arrangement can be optimally adapted to the actuation force requirements of the valve arrangement.

The aforementioned contours can have the most various forms. For example, bolsterlike, annular conical and spherical caplike protuberances are suitable. They need not necessarily be concentric to the axis of motion of the armature, but the concentric form does make them easier to manufacture. The respective counterpart contour preferably has geometrically complementary countersunk features.

Preferably, as noted, the pole core segment, the transition segment, and the tube segment are embodied in one piece from a magnetic material. This allows especially inexpensive manufacture of the pole tube. The manufacture is especially simple if the transition segment has a radial groove in an outer face of the pole tube. The transitions from the radial groove to the pole core segment and from the radial groove to the tube segment can be rounded, to prevent fissuring.

The bolster can be embodied as somewhat shorter than a collar segment of the pole core. As a result, the slight increase of force effected by the collar segment can be used in the segment of the characteristic curve that is remote from the pole core.

In a preferred feature of the present invention, a radial gap between the bolster and the countersunk feature is dimensioned such that in a terminal position associated with the pole core segment, a motion of the armature is fluidically damped. As a result, the mechanical load on the pole tube and optionally on a nonstick disk placed between the armature and the pole core segment is lessened.

In an especially preferred feature of the present invention, a first position of the armature, in which the end face of the armature is facing an end, toward the pole core segment, of the transition segment, and/or a second position of the armature, in which an end face of the bolster of the armature is facing the bottom face of the pole core segment, is disposed in accordance with an expected profile of forces for flow forces acting on the valve slide in an opening operation.

Preferably, the second position of the armature corresponds to a nearly completely open flow cross section. At that point, the flow-caused restoring forces on the valve slide countersunk feature. The reduced actuation forces once the bolster dips into the countersunk feature are still sufficient to connect the valve fully through.

BRIEF DESCRIPTION OF THE DRAWINGS

The present invention and its advantages are described in greater detail below in terms of the exemplary embodiment shown in the drawings.

DESCRIPTION OF THE PREFERRED EMBODIMENT

Figure 1:
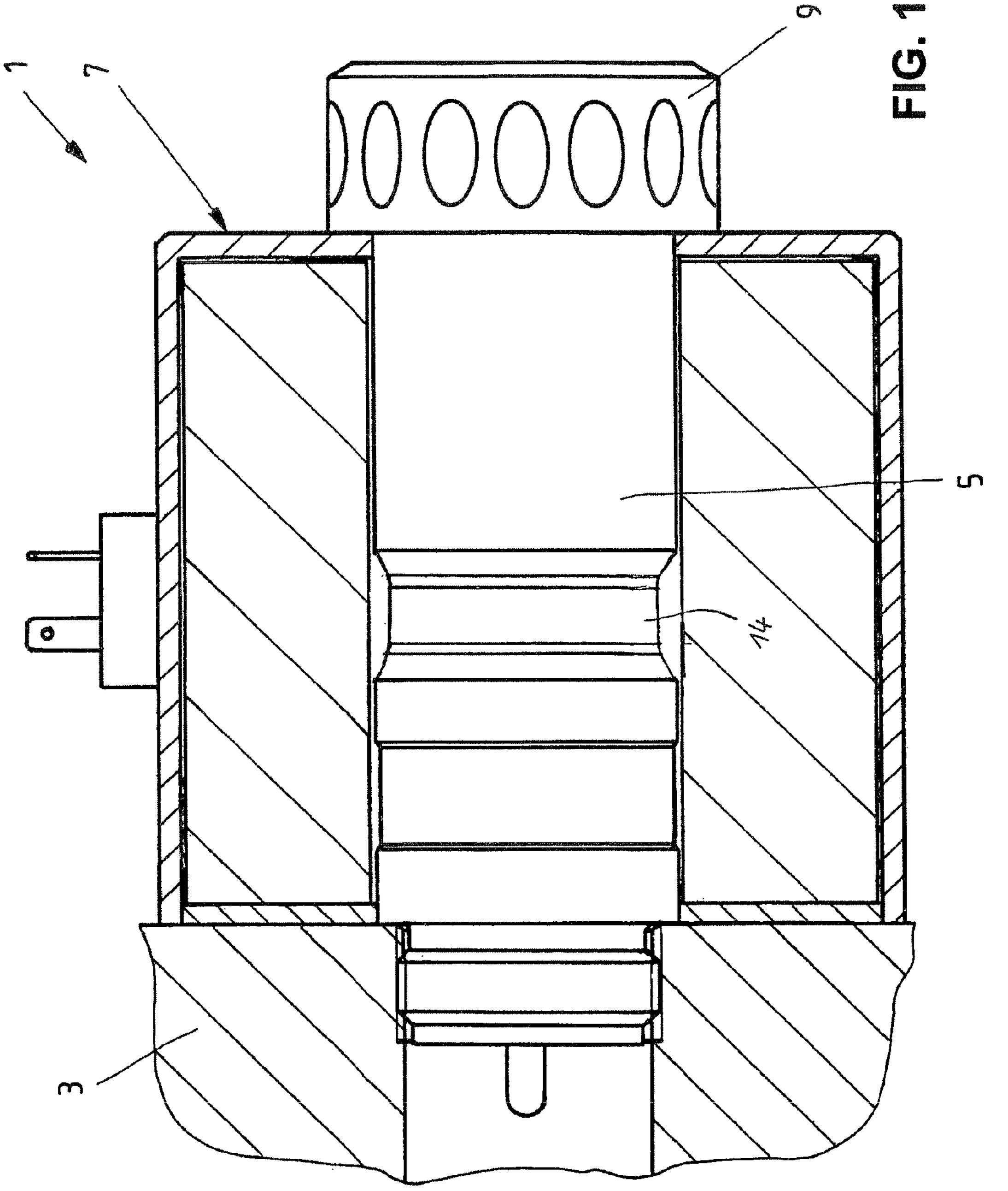
FIG. 1 shows a partial section view through a solenoid arrangement of the present invention, with a pole tube secured to a valve housing, with a coil body seated on the pole tube, and with a housing surrounding the coil body.

FIG. 1 shows the typical construction of a solenoid 1, of the kind used for actuating switching valves in fluidics, having a pole tube according to the invention inserted therein. On a valve housing 3, a pole tube 5 of the solenoid 1 is screwed into the valve bore. A magnet coil 7 is slipped onto the pole tube 5. The magnet coil 7 is secured on the pole tube 5 by means of a nut 9. At a transition segment 14, the pole tube is constricted in terms of its external radius.

Figure 2:
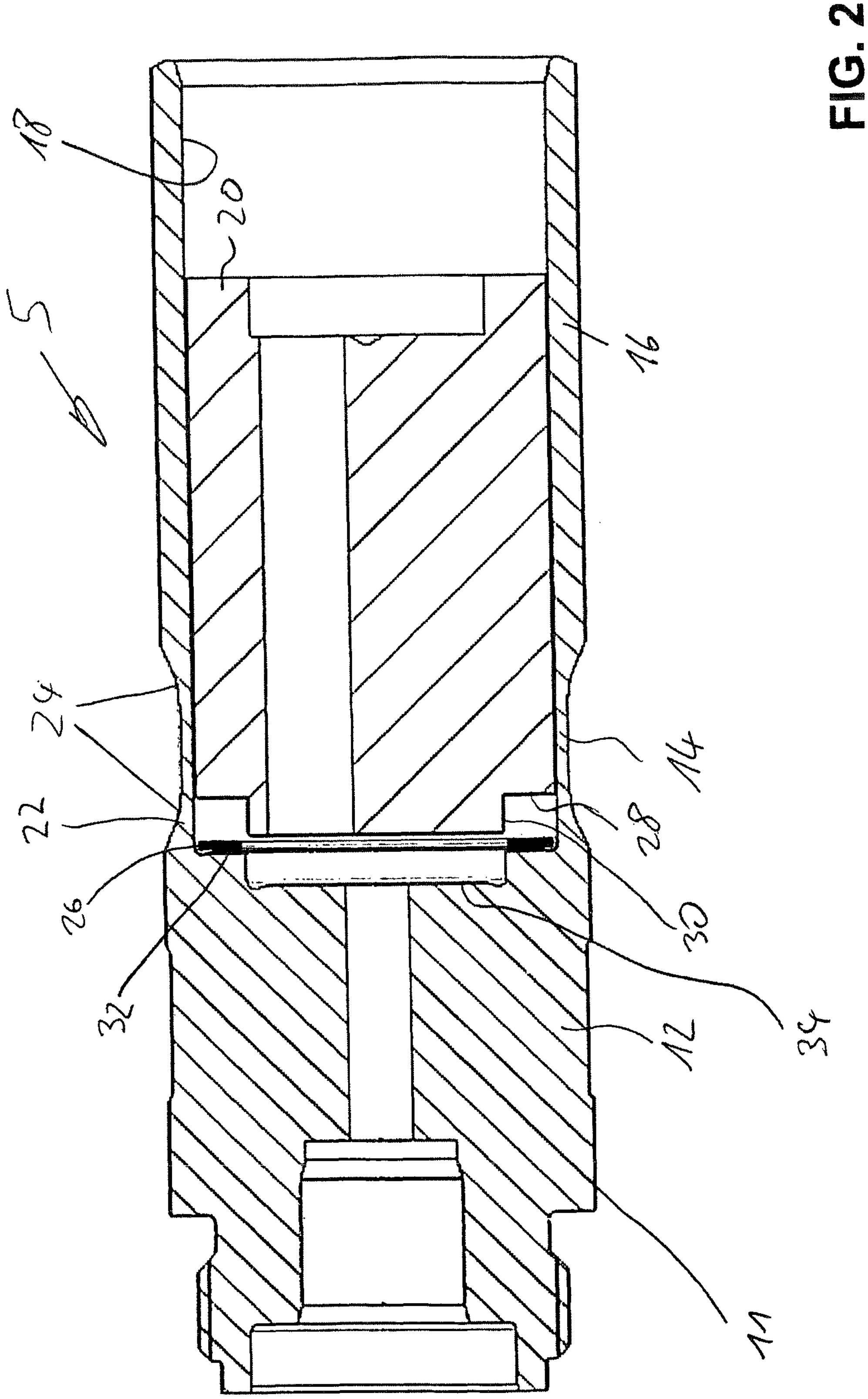
FIG. 2 shows a section through the pole tube of the solenoid arrangement shown in FIG. 1.

FIG. 2 shows the construction of the pole tube 5, and the armature guided in it, in accordance with the present invention. A pole tube body 11 is furnished in the form shown, from a ferromagnetic steel, such as goods in bar form, by metal-cutting machining.

The pole tube body 11 is subdivided axially into a pole core 12, a transition segment 14, and a tube segment 16. The overall bushlike shape of the pole tube body 11 allows the insertion of an armature 20 into a central bore 18. The bore 18, on its end remote from the pole core 12, at the opening of the tube segment 16, is later provided with a closure piece (not shown)—also called a stroke limiter—which at the same time has a thread for securing the nut 9.

An annular-conical collar 22 protrudes from the pole core 12. Via a rounded area, this collar merges with a tube segment 16. In comparison to the pole core 12 and the tube segment 16, the outer circumferential surface of the pole tube 5 is constricted by a radial groove at the transition segment 14. Via a further rounded area 24 and an obliquely positioned conical outer face, the transition segment 14 merges with the tube segment 16.

The armature 20 is supported axially displaceably in the bore 18. A nonstick disk 26 is placed in the working air gap between the armature 20 and the pole core 12.

The armature 20 is contoured, on its face end toward the pole core 12, by a step: A cylindrical bolster 30 protrudes from the annularly embodied end face 28.

In the bottom face 32 of the bore 18, there is a countersunk feature 34 that corresponds geometrically with the bolster 30. This means that the bolster 30 can dip into the countersunk feature 34. Both the axial length and the radial length of the bolster 30 are selected with regard to the desired characteristic curve form, as will be described hereinafter. The depth of the countersunk feature 34 is selected such that, taking into account the nonstick disk 26, there is still a gap between the bottom of the countersunk feature 34 and the end face of the bolster 30 even when the armature 20 is in its terminal position toward the pole core.

Figure 3:
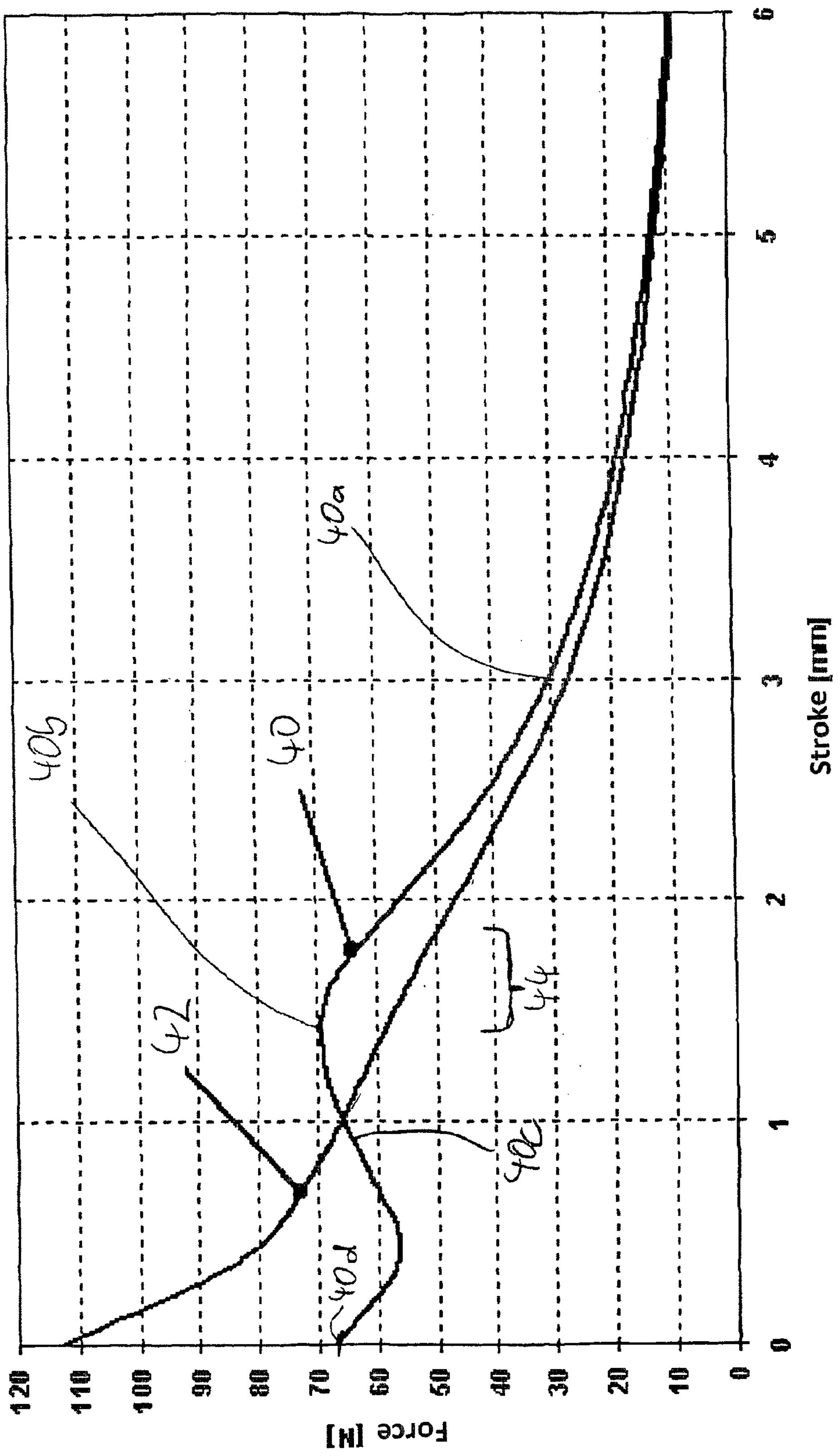
FIG. 3 shows a force-stroke characteristic curve of the solenoid arrangement of the invention, in comparison to a force-stroke characteristic curve of a conventional solenoid.

FIG. 3 shows the force-stroke characteristic curve 40 of the solenoid arrangement 1 of the invention, in comparison to the force-stroke characteristic curve 42 of a conventional solenoid arrangement, which though it has a thin-turned pole tube does not have contouring of the armature face end toward the pole core or of the bottom of the bore 18 at the pole core 12.

In the solenoid arrangement 1 of the invention, as the characteristic curve 40 compared to the characteristic curve 42 shows, it was possible to attain a more-pronounced increase in the actuation force in an early segment 40*a* of the stroke process. At this point the armature 20 is still at a great distance from the pole core 12. The contours of the end face of the armature and of the bottom face of the pole core 12, that is, of the bolster 30 and the countersunk feature 34, do not yet axially overlap.

The characteristic curve 40 rises more steeply as the armature 20 approaches closer to the pole core 12, until in the segment 40*b* a plateau develops. The segment 40*b* corresponds to a position of the armature 20 in which the bolster 30 is located just before the bottom face 32 and in other words has not yet dipped into the countersunk feature 34.

With the embodiment of the axial overlap, which in this example is when the bolster 30 dips into the countersunk feature 34, the characteristic curve 40 initially falls, in the segment 40*c*. Upon contact of the armature 20 with the pole core 12, the characteristic curve 40 finally rises moderately and concludes with the retention force 40*d*, but no longer goes higher than the plateau reached in segment 40*b*.

The influence of the annular-conical collar 22 on the characteristic curve 40 an also on the characteristic curve 42 is marginal. In the stroke range 44, at most, a minimal bulge in the characteristic curve 42 can be seen. The rise in the characteristic curve 40 attained by the contouring of the armature 20 and of the bottom of the pole core 12 far exceeds any influence on the part of the annular-conical collar.

By adaptation of the axial length of the bolster 30, the location of the plateau segment 40b of the characteristic curve 40 can be varied. The radial length of the bolster 30 and the size of the radial gap between the bolster 30 and the countersunk feature 34 have an influence on the height of the plateau and on the variously strongly pronounced nature of the protuberance of the characteristic curve 40 compared to the characteristic curve 42. The air gap from the bottom of the countersunk feature that remains, in the terminal position of the armature 20 on the pole core 12, has an influence on the retention force 40*d*. In particular by the described adaptations of the armature contour and the bottom contour, the characteristic curve 40 is adapted to the actuation force characteristic curve of a fluidic valve in such a way that a range in which strong actuation forces are required—such as from the onset of opening of a fluid path in the valve until the path is completely open—is approximately equivalent to the plateau segment 40*b*. Thus flow forces that act in the closing direction of the valve, especially, are securely overcome, and the valve slide is connected through from every actuation state.

Especially with proportional valves, in which the position of the valve slide is controlled by the actuation force acting counter to a spring and furnished by the solenoid 1, the characteristic curve 40 that falls near 40*c* is advantageous. The result on the position axis is a very narrow sectional range between the spring characteristic curve 42 and the force-stroke characteristic curve 40. The desired position of the valve slide can thus be triggered very precisely, and with little deviation, by means of the supply of electrical current to the solenoid 1.

The invention is based generally on the concept of providing both the face end, toward the pole core segment, of the armature and a bottom, provided in the interior of the pole tube on the pole core segment, with a respective contour that allows a mutual axial overlap. This makes advantageous variation of the force-stroke characteristic curve of the solenoid possible, at low production cost.

The foregoing relates to the preferred exemplary embodiment of the invention, it being understood that other variants and embodiments thereof are possible within the spirit and scope of the invention, the latter being defined by the appended claims.

The invention claimed is:

1. A solenoid arrangement, comprising:

a pole tube which is defined axially by a pole core segment, a transition segment having a uniform wall thickness, and a tube segment, in which the transition segment has a lesser wall thickness than the tube segment; and an armature guided movably in the pole tube in a path of movement, the armature, on an end toward the pole core segment, having a bolster axially protruding from an end face, wherein a cylindrical countersunk feature is present in a bottom face, toward the armature, of the pole core segment, the cylindrical countersunk feature defining a countersunk space, wherein the bolster of the armature is configured to be received in the countersunk feature, wherein the pole core segment, beginning at the bottom face, has an annular-conical collar segment, which is adjoined by the transition segment, and wherein an axial measurement of the collar segment exceeds an axial measurement of the bolster, and wherein the bolster is completely spaced apart from the countersunk space for at least a portion of movement of the armature in the path of movement.

2. The solenoid arrangement as defined by claim 1, wherein the pole core segment, the transition segment, and the tube segment are embodied in one piece from a magnetic material.

3. The solenoid arrangement as defined by claim 1, wherein a radial gap between the bolster and the countersunk feature is dimensioned such that in a terminal position associated with the pole core segment, a motion of the armature is fluidically damped.

4. The solenoid arrangement as defined by claim 1, wherein the transition segment has a radial groove in an outer face of the pole tube.

5. The solenoid arrangement as defined by claim 4, wherein transitions from the radial groove to the pole core segment and from the radial groove to the tube segment are rounded.

6. A solenoid arrangement, comprising:

a pole tube defining a longitudinal direction and including:

a pole core segment, a transition segment extending from the pole core segment, the transition segment comprising a first wall defining a transition space, and a tube segment extending from the transition segment, the tube segment comprising a second wall defining a tube space; and an armature guided movably in the pole tube in a path of movement, wherein the pole core segment includes (i) a first body that defines a first body passage, and (ii) a countersunk feature that defines a countersunk space that is in fluid communication with said first body passage, the first body passage and the countersunk space defining a pole tube passage, wherein the armature is positioned in the transition space and the tube space and includes (i) a second body that defines a second body passage, and (ii) a bolster protruding from the second body and defining a bolster passage that is in fluid communication with the second body passage, the bolster being configured to be received in the countersunk space, and the second body passage and the bolster passage defining an armature passage, wherein the pole tube passage and the armature passage are in fluid communication with each other, wherein the pole core segment has a collar segment that adjoins the transition segment, wherein (i) the collar segment extends for a first distance in the longitudinal direction, (ii) the bolster extends for a second distance in the longitudinal direction, and (iii) the first distance is greater than the second distance, and wherein the bolster is completely spaced apart from the countersunk space for at least a portion of movement of the armature in the path of movement.

7. The solenoid arrangement as defined by claim 6, wherein the pole core segment, the transition segment, and the tube segment are embodied in one piece from a magnetic material.

8. The solenoid arrangement as defined by claim 6, wherein a radial gap between the bolster and the countersunk feature is dimensioned such that in a terminal position associated with the pole core segment, a motion of the armature is fluidically damped.

9. The solenoid arrangement as defined by claim 6, wherein the transition segment defines a radial groove in an outer face of the pole tube.

10. The solenoid arrangement as defined by claim 9, wherein transitions from the radial groove to the pole core segment and from the radial groove to the tube segment are rounded.

11. A solenoid arrangement, comprising:

a pole tube defining a longitudinal direction and including:

a pole core segment, a transition segment extending from the pole core segment, the transition segment comprising a first wall defining a transition space and having a first wall thickness, and a tube segment extending from the transition segment, the tube segment comprising a second wall defining a tube space and having a second wall thickness that is greater than the first wall thickness; and an armature guided movably in the pole tube in a path of movement, wherein the pole core segment includes (i) a first body that defines a first body passage, and (ii) a countersunk feature that defines a countersunk space that is in fluid communication with said first body passage, the first body passage and the countersunk space defining a pole tube passage configured to receive fluid flow therethrough, wherein the armature is positioned in the transition space and the tube space and includes (i) a second body that defines a second body passage, and (ii) a bolster protruding from the second body and defining a bolster passage that is in fluid communication with the second body passage, the bolster being configured to be received in the countersunk space, and the second body passage and the bolster passage defining an armature passage configured to receive fluid flow therethrough, and wherein the pole tube passage and the armature passage are in fluid communication with each other, wherein the pole core segment has a collar segment that adjoins the transition segment, wherein (i) the collar segment extends for a first distance in the longitudinal direction, (ii) the bolster extends for a second distance in the longitudinal direction, and (iii) the first distance is greater than the second distance, and wherein the bolster is completely spaced apart from the countersunk space for at least a portion of movement of the armature in the path of movement.

12. The solenoid arrangement as defined by claim 11, wherein the pole core segment, the transition segment, and the tube segment are embodied in one piece from a magnetic material.

13. The solenoid arrangement as defined by claim 11, wherein a radial gap between the bolster and the countersunk feature is dimensioned such that in a terminal position associated with the pole core segment, a motion of the armature is fluidically damped.

14. The solenoid arrangement as defined by claim 11, wherein the transition segment defines a radial groove in an outer face of the pole tube.

15. The solenoid arrangement as defined by claim 14, wherein transitions from the radial groove to the pole core segment and from the radial groove to the tube segment are rounded.

* * * * *